(12) United States Patent
Adler (10) Patent No.: US 8,358,521 B2
(45) Date of Patent: Jan. 22, 2013

(54) INTRINSICALLY SAFE SYSTEMS AND METHODS FOR GENERATING BI-POLAR HIGH VOLTAGE

(75) Inventor: Richard J Adler, Marana, AZ (US)

(73) Assignee: Applied Energetics, Inc, Tucson, AZ (US)

( * ) Notice: Subject to any disclaimer, the term of this patent is extended or adjusted under 35 U.S.C. 154(b) by 264 days.

(21) Appl. No.: 12/436,018

(22) Filed: May 5, 2009

(65) Prior Publication Data
US 2009/0213625 A1     Aug. 27, 2009

Related U.S. Application Data

(63) Continuation-in-part of application No. 11/345,173, filed on Feb. 1, 2006, now Pat. No. 7,542,314.

(51) Int. Cl.
*H02M 7/25* (2006.01)
(52) U.S. Cl. .......................... 363/65; 363/68
(58) Field of Classification Search .................. 323/268, 323/272, 350; 363/43, 65, 67, 70, 68
See application file for complete search history.

(56) References Cited

U.S. PATENT DOCUMENTS

| | | | | | |
|---|---|---|---|---|---|
| 3,002,142 | A | * | 9/1961 | Jensen | 363/43 |
| 3,539,902 | A | * | 11/1970 | Hickling | 363/43 |
| 4,344,123 | A | * | 8/1982 | Bhagwat et al. | 363/43 |
| 4,628,438 | A | * | 12/1986 | Montague | 363/134 |
| 4,737,901 | A | * | 4/1988 | Woodward | 363/43 |
| 4,841,429 | A | * | 6/1989 | McClanahan et al. | 363/126 |
| 5,930,128 | A | * | 7/1999 | Dent | 363/43 |
| 7,542,314 | B2 | * | 6/2009 | Adler | 363/65 |
| 2004/0252531 | A1 | * | 12/2004 | Cheng et al. | 363/43 |
| 2009/0213625 | A1 | * | 8/2009 | Adler | 363/65 |

* cited by examiner

*Primary Examiner* — Jeffrey Sterrett
(74) *Attorney, Agent, or Firm* — Duft Bornsen & Fishman LLP; Gregory T. Fettig (57) ABSTRACT

Systems and methods presented herein generally provide for the controlled voltage of bipolar electrical energy through the selected operation of power stages. In one embodiment, a system that provides electrical energy includes a power supply and at least two power stages coupled to the power supply. The power stages are operable to selectively output electrical energy. By selecting the number of power stages which are turned on at a given time the total voltage of the electrical energy is controlled at that time. The system may further include one or more controllers coupled to the power stages to control selection of the power stages and thereby vary the output voltage.

6 Claims, 10 Drawing Sheets

INTRINSICALLY SAFE SYSTEMS AND METHODS FOR GENERATING BI-POLAR HIGH VOLTAGE

CROSS REFERENCE TO RELATED APPLICATIONS

This patent application is a continuation-in-part patent application claiming priority to commonly owned and co-pending U.S. patent application Ser. No. 11/345,173 (filed Feb. 1, 2006), the entire contents of which are hereby incorporated by reference.

TECHNICAL FIELD

Systems and methods presented herein are generally directed to controllably changing output voltage of electrical energy. More specifically, the systems and methods provide for changing output voltage of high-voltage electrical energy to control the waveform of the high voltage electrical energy.

BACKGROUND

Electrical power supplies provide electrical energy for a variety of applications. Often, power supplies receive electrical energy from a source, such as a generator, and convert that electrical energy to an application-specific form. For example, a power supply may receive electrical energy as alternating current ("AC") and convert that electrical energy to direct current ("DC"). The power supply may then provide the DC electrical energy to a device (e.g., a "load") to operate the device. Lower voltage power supplies are routinely built at voltages up to 10V and, in some instances, output arbitrary and/or pre-programmed waveforms as a function of time.

Higher-voltage power supplies are generally those power supplies providing electrical energy at voltages of greater than 100 volts, often having more unique applications than their lower voltage counterparts. For example, high-voltage pulsed power supplies may be used in certain types of ion implantation, such as Plasma Source Ion Implantation ("PSII") and/or Shallow Implantation and Diffusion Hardening ("SIDH"). In this regard, such power supplies may be used to control doping profiles in semiconductors.

In PSII, a target (e.g., a silicon wafer) is placed directly inside an ion source. High voltage negative pulses applied to the target attract positive ions in the plasma and thereby strike the target at normal angles of incidence. Similarly, in SIDH, the target is immersed in a plasma and pulsed with high-voltage electrical energy. The pulsing of the electrical energy allows ions from the plasma to penetrate within the target. By varying the voltage, the depth dose profile can be varied. High-voltage power supplies, however, are not limited to such applications. Rather, high-voltage power supplies may be used in a variety of applications, such as plastic curing and medical imaging (e.g., x-rays).

SUMMARY

Systems and methods presented herein generally provide for the controlled voltage of electrical energy through the selected operation of a series of power stages. In one embodiment, a system that provides electrical energy includes a power supply and at least two power stages coupled to the power supply to provide power at an output (e.g., to a load coupled to the power stages). The power stages can selectively output electrical energy. Selected power stages control voltage of the electrical energy. For example, one turned-on power stage may provide an output of 1*V volts, a second turned-on power stage, in combination with the first, may provide an output of 2*V volts, and so on. In one embodiment, the system may provide greater than 1 kilovolts ("kV") of output electrical energy and, in some cases, greater than 1 megavolts ("MV").

The system may further include a controller coupled to the power stages to control selection of the power stages. For example, a single controller may be configured with the power stages to control such operational aspects. Alternatively or additionally, each power stage may include one or more drivers that control various operational aspects of the individual power stage, such as whether the output of the stage is turned "on". For example, the controller may be communicatively coupled to the drivers to control operation of the power stages.

The system may further include a storage unit that stores instructions with each driver. The instructions may be software instructions that direct arbitrary selection by the controller of the power stages. Alternatively, the software instructions may direct selection by the controller of the at least two power stages according to a predetermined sequence.

In one embodiment, the power stages are serially coupled to additively control voltage of the electrical energy. For example, when serially coupled, voltage of electrical energy from a first power stage may add/subtract to voltage of electrical energy from one or more other power stages.

In another embodiment, a method of controlling voltage of electrical energy includes generating electrical energy and providing the electrical energy to at least two power stages. Additionally, the method includes selecting operability of the power stages to control voltage of the electrical energy. For example, with one power stage operating, a voltage of 1*V may be output; with 2 power stages operating, a voltage of 2*V may be output, etc.

Providing the electrical energy may include magnetically coupling electrical energy to the power stages. Controlling operability of the power stages may include generating at least one control signal to operate at least one switch with a first of the power stages. For example, generating at least one control signal may include processing instructions that direct the power stages to arbitrarily conduct the electrical energy or direct the power stage to conduct the electrical energy according to a predetermined sequence.

In one embodiment, the method further includes receiving an input signal with a driver to direct a power stage to conduct the electrical energy. In this regard, the controller may generate control signals that are received by the driver to control operability of the power stages. The control signals may include electronic signals and/or optoelectronic signals. For example, the driver may be configured with an amplifier to receive an electronic control signal at its input such that the amplifier generates a signal for disconnecting a power stage from electrical conduction. Alternatively or additionally, the driver may be configured with a fiber-optic receiver that receives an optical signal at its input such that the driver generates a signal for disconnecting a power stage from electrical conduction.

The method may also include outputting voltage controlled electrical energy. The method may also include filtering the electrical energy when one or more of the power stages are operable. For example, the method may include filtering the electrical energy by bandwidth limiting the electrical energy to approximately 1 MHz. The electrical energy input may be AC electrical energy and, as such, the method may further include converting AC electrical energy to unipolar electrical energy. The sequencing of power stages may arbitrarily convert the output voltage of the electrical energy to a high voltage output.

In another embodiment, a system that controls voltage includes a power supply and a plurality of power stages coupled to the power supply, wherein the power stages are coupled in series and receive electrical energy from the power supply. The system also includes at least one controller communicatively coupled to the power stages, wherein the controller operates the power stages to control the voltage of the electrical energy output from the system. The power supply may be a high voltage power supply.

The system may further include a storage element that stores instructions. For example, the instructions may direct the controller to substantially arbitrarily select zero or more power stages to control the voltage of the electrical energy output from the system. Alternatively, the instructions may direct the controller to select zero or more power stages according to a predetermined sequence to control the voltage of the electrical energy output from the system. In one embodiment, the controller generates one or more control signals that are received by one or more drivers to direct the drivers to select zero or more power stages. Since the drivers connect and disconnect power stages from electrical conduction, the controller controls the voltage of the electrical energy output from the system via the control operation of the drivers.

In another embodiment, a system that provides electrical energy includes a power supply and at least two power stages coupled to the power supply. The power stages are operable to receive electrical energy from the power supply. The system also includes at least two drivers. For example, a driver may be a part of the power stage which receives and implements instructions from an external controller. A first of the drivers is configured with a first of the power stages and a second of the drivers is configured with a second two power stages. The controller cooperatively selects zero or more drivers for electrical conduction to thereby control electrical energy output from the power stages.

In another embodiment, a bipolar electrical energy generator includes a power supply that provides electrical energy and a plurality of power stages coupled to the power supply. Bipolar generally refers to the manner in which voltage crosses between positive and negative. The power stages are operable to receive the electrical energy and cooperatively provide a bipolar voltage waveform from the received electrical energy. Each power stage provides an incremental voltage step to the bipolar voltage waveform.

The power stages may include pairs of insulated gate bipolar transistor operable to control incremental voltage step of the power stage and may include a zener diode operable to protect the insulated gate bipolar transistor against over voltage. The system may also include a controller communicatively coupled to the power stages, wherein the controller controls selection of said at least two power stages. The system may also include a storage unit that stores instructions for the directed arbitrary selection of the power stages. Alternatively or additionally, the instructions may direct selection by the controller of said at least two power stages according to a predetermined sequence.

The power stages may include a driver that controls operability of the power stage. The power stages may be serially coupled to additively control voltage of the electrical energy. And, a first portion of the power stages may add a positive incremental voltage step to the bipolar voltage waveform and a second portion of the power stages may add a negative incremental voltage step to the bipolar voltage waveform.

In another embodiment, a method of providing bipolar electrical energy includes generating electrical energy, providing the electrical energy to a plurality of power stages, controlling operability of the power stages to provide a selectively incremental output voltage that varies between positive and negative voltages over time and thereby provide the bipolar electrical energy. The method may further include adding a positive incremental voltage step to the bipolar electrical energy with a first portion of the power stages and adding a negative incremental voltage step to the bipolar electrical energy with a second portion of the power stages.

DETAILED DESCRIPTION OF THE DRAWINGS

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 1:
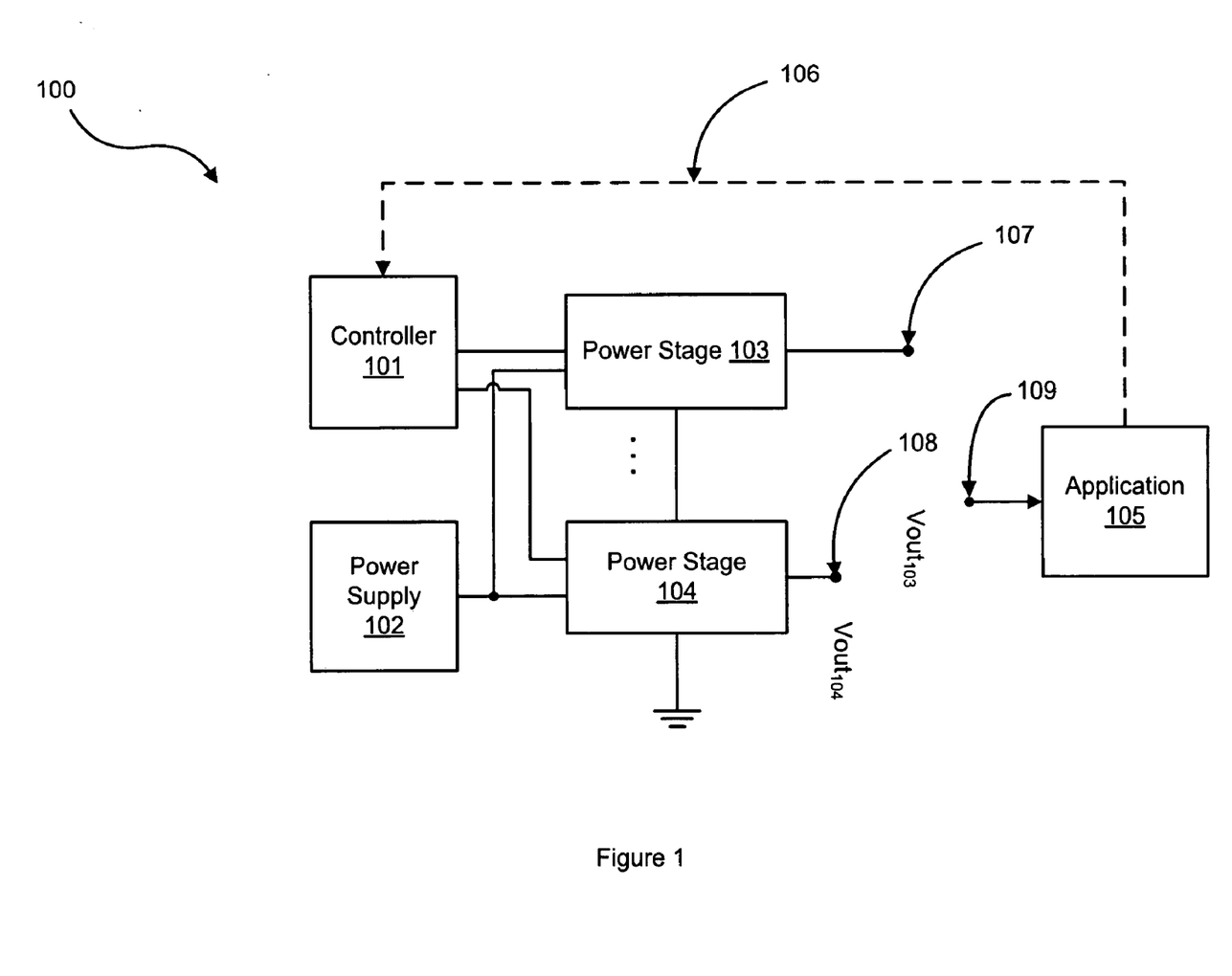
FIG. 1 is a block diagram of an exemplary system that provides electrical energy.

FIG. 1 is a block diagram of exemplary system 100. System 100 is configured for providing electrical energy. In one embodiment, it may be desirable to maintain the coherency of the electrical energy conduction by reducing energy-draining spurious discharges through a medium (e.g., air). In this regard, system 100 may controllably vary the voltage of the electrical energy to compensate for changes in the medium to maintain a coherent electrical energy conduction.

System 100 includes power supply 102 for generating electrical energy. In one embodiment, power supply 102 generates high-voltage AC electrical energy. The generated electrical energy is provided to power stages 103 and 104 for output to application 105. In one embodiment, power supply 102 couples to power stages 103 and 104 to deliver the electrical energy. For example, power supply 102 may include a coil that couples (e.g., magnetically) to coils of power stages 103 and 104. Such a coupling is described in greater detail below in FIGS. 2 and 3. It should be noted, however, that other forms of power generation may be used.

In one embodiment, power supply 102 is capable of delivering peak power of about 100 kilowatts ("kW"). Additionally, power supply 102 may pulse the AC electrical energy, for example, at a frequency of about 100 kHz. The output waveform of the energy pulses may have durations of about 5 milliseconds ("ms"). The output waveform can also have transitions as rapid as a "Turn-on" time ("$T_{on}$") of less than about 0.5 μsec. Similarly, the "Turn-off" time ("$T_{off}$") can be as short as about 0.5 μsec. Additionally, the energy stored in the power stage may be in the exemplary range of 3 joules to about 50 joules and a 1 MV unit there would be exemplarily configured with about 260 3.8 kV stages, although other voltages and configurations may be achieved.

System 100 controllably selects operation of power stages 103 and 104 such that the electrical energy is arbitrary, when output to application 105 at node 109 via nodes 107 and/or 108. For example, power stages 103 and 104 may be coupled in series to additively provide electrical energy (i.e., the output voltage from system 100 is increased by selecting more power stages for operation and decreased by deselecting power stages from operation). As such, output voltage $Vout_{103}$ of power stage 103 may combine with output voltage $Vout_{104}$ of power stage 104 to add or subtract from the total output voltage of system 100 depending on the operation of the power stages.

In one embodiment, power stages 103 and 104 are used to provide a bipolar waveform (e.g., a positive/negative discretely varying waveform). Additionally, power stages 103 and 104 may provide filtering of the output electrical energy depending on a particular application. Such waveform generation and filtering are discussed in greater detail below in FIG. 2.

To control the operation of power stages 103 and 104, system 100 includes controller 101 which generates control signals to select and deselect power stages, thereby controlling the output voltage of the electrical energy from system 100. In one embodiment, controller 101 may be externally controlled in real time or externally programmed with stored waveform creation information.

Additionally, implementation of controller 101 may be application-specific. For example, controller 101 may be configured as a microprocessor with associated instruction storage. As such, controller 101 may process the instructions to determine the output voltage of the electrical energy provided to application 105. In one embodiment, instructions direct operation of power stages 103 and 104 in an arbitrary or predetermined fashion. In another embodiment, controller 101 may be configured with a signal input. For example, controller 101 may receive and process an input signal to direct operational selection of power stages 103 and 104. The input signal may be a feedback signal from application 105. Based on the feedback signal, controller 101 may determine a requisite voltage for application 105 and accordingly control operation of power stages 103 and 104.

System 100 as illustrated is merely suggestive of an electrical energy delivery system that may include numerous more power stages. In one embodiment, system 100 may include as many as 294 power stages for delivering about 1 MV of electrical energy at approximate 3.5 kV increments. As shown herein, system 100 may be configured to incrementally provide 2 MV. Power stages 103 and 104 and additional series stages may also cooperatively provide increments of 3.5 kV, 7 kV, 10.5 kV, 14 kV . . . 1001 kV, 1004.5 kV . . . 1998.5 kV, 2002 kV. But, as stated, more power stages may be added to system 100 to increase definition of electrical energy output voltage to application 105.

System 100 may be configured to provide electrical energy for a variety of applications. Some non limiting examples of such applications may include plastic curing, high-power transmitter systems, ion implantation systems, medical imagery systems (e.g., x-rays systems), and/or conduction through a gas.

Figure 2:
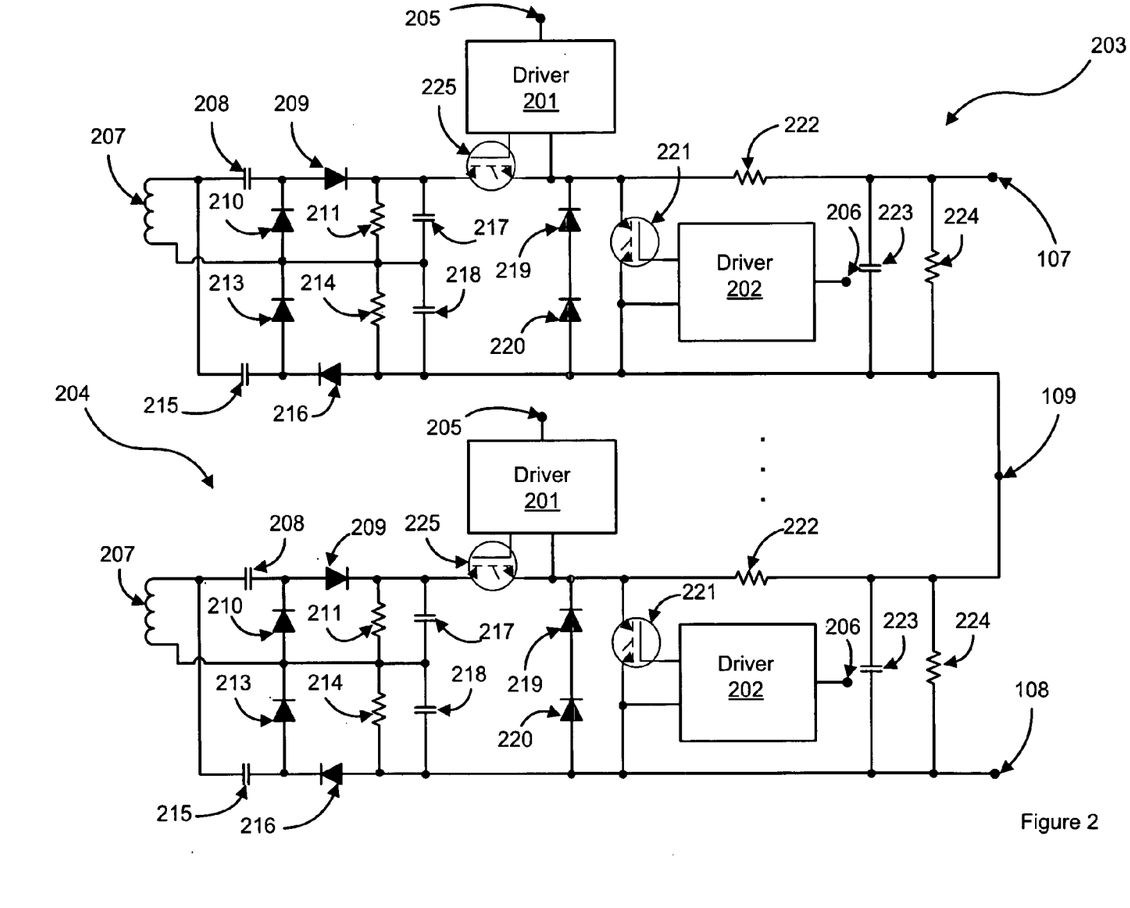
FIG. 2 is a circuit diagram of exemplary power stages that output electrical energy.

FIG. 2 is a circuit diagram of exemplary power stages 203 and 204 that output electrical energy via output nodes 107 and/or 108. For example, power stages 203 and 204 may be serially coupled at node 109 such that output voltage of the electrical energy adds via output nodes 107 and 108 when provided to an application, such as application 105 of FIG. 1. By controlling operability of power stages 203 and 204, voltage of the electrical energy provided to the application between nodes 107 and 108 may decrease or increase. That is, when power stages 203 or 204 are operable, maximum voltage may be applied to the application via node 107. When one of power stages 203 or 204 is turned off, the voltage applied to the application may be half of the maximum voltage at node 107. Similarly, when both power stages 203 and 200 are turned off, no voltage is applied to the application via node 107.

In this embodiment, power stages 203 and 204 are configured identically. As such, it is only necessary to discuss operability of a single power stage, e.g., power stage 203. However, those skilled in the art should readily recognize that power stages 203 and 204 may be configured differently and, as such, the invention is not intended to be limited to the illustrated embodiment. Examples of other configurations are shown and described in FIGS. 8 and 9.

Power stage 203 receives electrical energy from a power supply, such as power supply 102 of FIG. 1, via coil 207. For example, the power supply may include a coil that magnetically couples to coil 207. Accordingly, the power supply and coil 207 may form a transformer that delivers electrical energy from the power supply to power stage 203. The use of air core coupling with the transformer provides an intrinsically safe manner for providing a power to power stages 203 and 204. For example, magnetic couplings of coils may decrease opportunities for sparking that are often inherent in conductive core isolation transformers and power supplies. By using "air core" coupling, the distance between the primary and secondary can be made large without reducing efficiency. However, the invention is not intended to be limited to coils for receiving power signals as other forms of energy transfer may be used (e.g., units connected to isolation transformers or separate power supplies). An example of such a coupling is shown and described below in FIG. 3.

The received electrical energy conducts to a prefilter/rectifier section of power stage 203. The prefilter/rectifier section is configured from: capacitors 208 and 215; diodes 210, 213, 216, and 209; and resistors 211 and 214. These components are used to provide an initial filter of the received electrical energy. For example, the received electrical energy may be a high voltage AC waveform (e.g., wherein the voltage is greater than a 1 kV). In addition to filtering, the prefilter/rectifier section may convert and multiply the AC waveform to a unipolar signal (i.e., the prefilter/rectifier section may "full wave" rectify and amplify the AC waveform).

The filtered and rectified waveform may then charge output capacitors 217 and 218 and thereby provide electrical energy to the application, e.g., via capacitors 217 and 218. Capacitors 217 and 218 may provide the "compliance current" such that electrical current may be supplied, for example, with only a minimal voltage decrease. This current may be determined by resistor 222 when power stage 203 is operational. In one embodiment, capacitors 217 and 218 provide a combined capacitance of about 0.5 microfarads ("μF"). In such an embodiment, resistor 222 may be about 30 Ohms ("Ω"). Additionally, since the number of power stages may in one embodiment be 294, the combined capacitance of the power stages may be about 1700 picofarads ("pF"; e.g., 0.5 uf/294 series stages=1700 pf), although other values may be used as a matter of design choice.

Power stage 203 also includes driver 201 and transistor 225 to control operability of the power stage. For example, driver 201 may generate a control signal which operates transistor 225. When transistor 225 is turned on by the control signal, electrical energy stored with capacitors 217 and 218 may be discharged to output node 107. When transistor 225 is turned off by the control signal operated through driver 201, electrical energy discharge from capacitors 217 and 218 is controllably disengaged from output node 107. In one embodiment, transistor 225 is an Insulated Gate Bipolar Transistor ("IGBT").

In this embodiment, power stage 203 also includes an output filter to provide post filtering of the rectified waveform. The output filter shown herein is a low pass filter configured from resistor 222 and capacitor 223. For example, the high voltage AC waveform as rectified by the prefilter/rectifier section may include noise, e.g., introduced by components of power stage 203, such as transistor 225. The output filter may remove higher frequency components of the noise because, again, such noise may have undesirable effects. In one embodiment, the bandwidth of the output filter is up to about 1 MHz. However, the output filter may be configured with other bandwidths depending on a particular application.

Additionally, power stage 203 is configured with resistor 224 to provide a naturally occurring voltage decrease. For example, when a lower output voltage is desired, operation of power stage 203 may be shut down with a control signal from driver 201 and, as previously stated, electrical energy from capacitors 217 and 218 is controllably disengaged.

Power stage 203 may include driver 202 to rapidly disengage discharge of electrical energy from capacitors 217 and 218 via node 107. For example, when a rapid decrease in voltage is desired, driver 202 may generate a control signal which turns on transistor 221 for conduction of electrical energy to ground. With transistor 225 turned off, electrical energy stored with capacitor 223 may discharge to ground through transistor 221. Capacitor 223 may also provide the compliance current as limited by resistor 222.

To generate control signals, drivers 201 and 202 may receive control signals from external sources. For example, controller 101 of FIG. 1 may generate control signals that are received by drivers 201 and 202. In response, drivers 201 and 202 may generate control signals that operably control switches 225 and 221, respectively. In one embodiment the control signals from the controller are optical control signals. In this regard, drivers 201 and 202 may include fiber-optic receivers that received in process the optical control signals from the controller even in the presence of significant voltage differences.

The fiber-optic receivers may provide certain advantages in minimizing direct electrical influence (e.g., via electronic control signals) that could possibly disrupt high voltage operations of the system, such as system 100 FIG. 1. For example, power stages 203 and 204 may provide high voltage electrical energy and, as such, may require materials not usually used in lower voltage power supplies, such as transformer oils or sulfur hexafluoride ($SF_6$). Fiber-optic connections to drivers 201 and/or 202 may circumvent electrical connection problems and decrease the reliance on such materials. However, those skilled in the art should readily recognize that the invention is not intended to be limited to fiber-optic receivers as such power stages may be used in lower voltage power supplies where electronic control and/or inductive control (e.g., inductors used in sensing) may be preferred. Those skilled in the art are familiar with fiber-optic receivers. An example of a driver configured with a fiber-optic receiver is shown and described below and FIG. 4.

Additionally, drivers 201 and 202 may include storage units that store software instructions to direct the drivers to control operability of power stage 203 responsive to the input signals. These software instructions may include arbitrarily directing drivers 201 and 202 to operate transistors 225 and 221, thereby arbitrarily engaging power stage 203 for providing electrical energy to output node 107. However, drivers 201 and 202 may be configured in other ways as a matter of design choice. For example, driver 201 may include circuitry that responds to an input signal delivered via input 205. In response to the input signal, driver 201 may generate a control signal to operate switch 225. In this regard, a controller, such as controller 351 of FIG. 5, may provide control signals to inputs 205 and 206 of drivers 201 and 202, respectively, to control the operability of power stage 203.

Also shown with power stage 203 are diodes 219 and 220. Diodes 219 and 220 are configured to allow current to flow around the power stage 203 when transistor 225 is turned off. In one embodiment, many components of power stage is 203 and 204 are designed for high voltage operations. For example, power stages 203 and 204 may be configured for operating at up to 2 MV when numerous stages are used. Accordingly, coil 207, capacitor 208, capacitor 215, capacitor 217, capacitor 218, capacitor 223, resistor 211, resistor 214, resistor 222, resistor 224, diode 210, diode 213, diode 209, diode 216, diode 219, diode 220 may each be configured as high voltage components expressly designed for such high voltage operations. Those skilled in the art are readily familiar with such components and their high voltage configurations.

Although one embodiment has been shown and described, the invention is not intended to be limited to the particular circuit shown herein. Rather, those skilled in the art should readily recognize that the invention may be configured in other ways that fall within the scope and spirit of the invention. For example, power stages 203 and 204 may be configured with single drivers 201 without using the substantially instantaneous shut down of a power stage provided by drivers 202 and transistors 221. Nor is the invention intended to be limited to the number of power stages shown and described herein. Rather, power stages 203 and 204 simply illustrate a scalable structure that receives electrical energy from a power supply and provides increments of that electrical energy based on the operations of the power stages. For example, a system, such as system 100 of FIG. 1, may include as many as 294 power stages 203/204 for delivering about 1 megavolt ("MV") of electrical energy at approximate 3.5 kilovolts ("kV") increments (e.g., 3.5 kV per power stage).

Additionally, the scalability of the power stages may not represent identical voltage increments. For example, power stages may be configured differently such that each provides a unique voltage when operational. Such may be accomplished through the magnetic coupling of coils 207 (i.e., of power stages 203 and/or 204) to a power supplying coil. That is, each coil 207 may be configured with a unique number of turns such that each coil 207, when magnetically coupled with the power supplying coil forms a transformer with a turns ratio that transforms the voltage from a first level to a second level. Transformers and their respective voltage amplification based on turns ratios are known to those skilled in the art.

Figure 3:
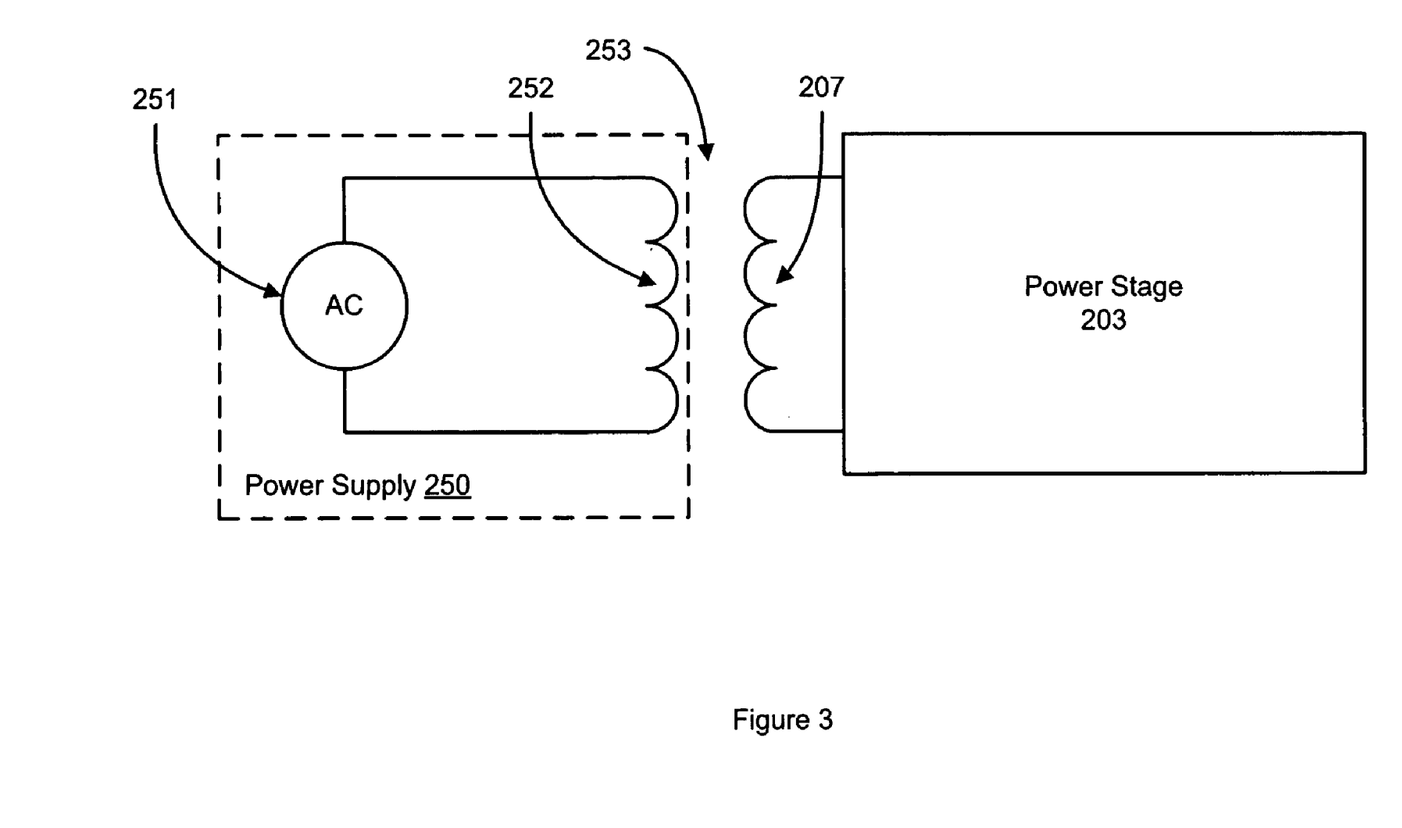
FIG. 3 is a block diagram of an exemplary power supply/power stage coupling.

FIG. 3 is a block diagram of an exemplary power supply/power stage coupling. For example, FIG. 3 illustrates a magnetic coupling between power supply 250 and power stage 203 of FIG. 2. In this embodiment, power supply 250 includes AC power source 251 for providing AC electrical energy to coil 252. Coil 252 magnetically couples to coil 207 of power stage 203. As such, coils 252 and 207 provide a transformer coupling having core 253 between power supply 250 and power stage 203.

As known to those skilled in the art, transformers may "step up" or "step down" voltage of electrical energy based on a turns ratio of the transformer and based on various resonance conditions. In one embodiment, the turns ratio between coil 252 and 207 is configured for providing an amplification of voltage from power supply 250 to about 3.5 kV output from power stage 203. However, other voltage outputs from power stage 203 may be desirable based on a particular application. Additionally, the voltage conversion may be intrinsically safe because electrical conduction between the coils is avoided. Core 253 may be an air core as ferrous materials add significant complexity to the design of high-voltage electrical power supplies.

Figure 4:
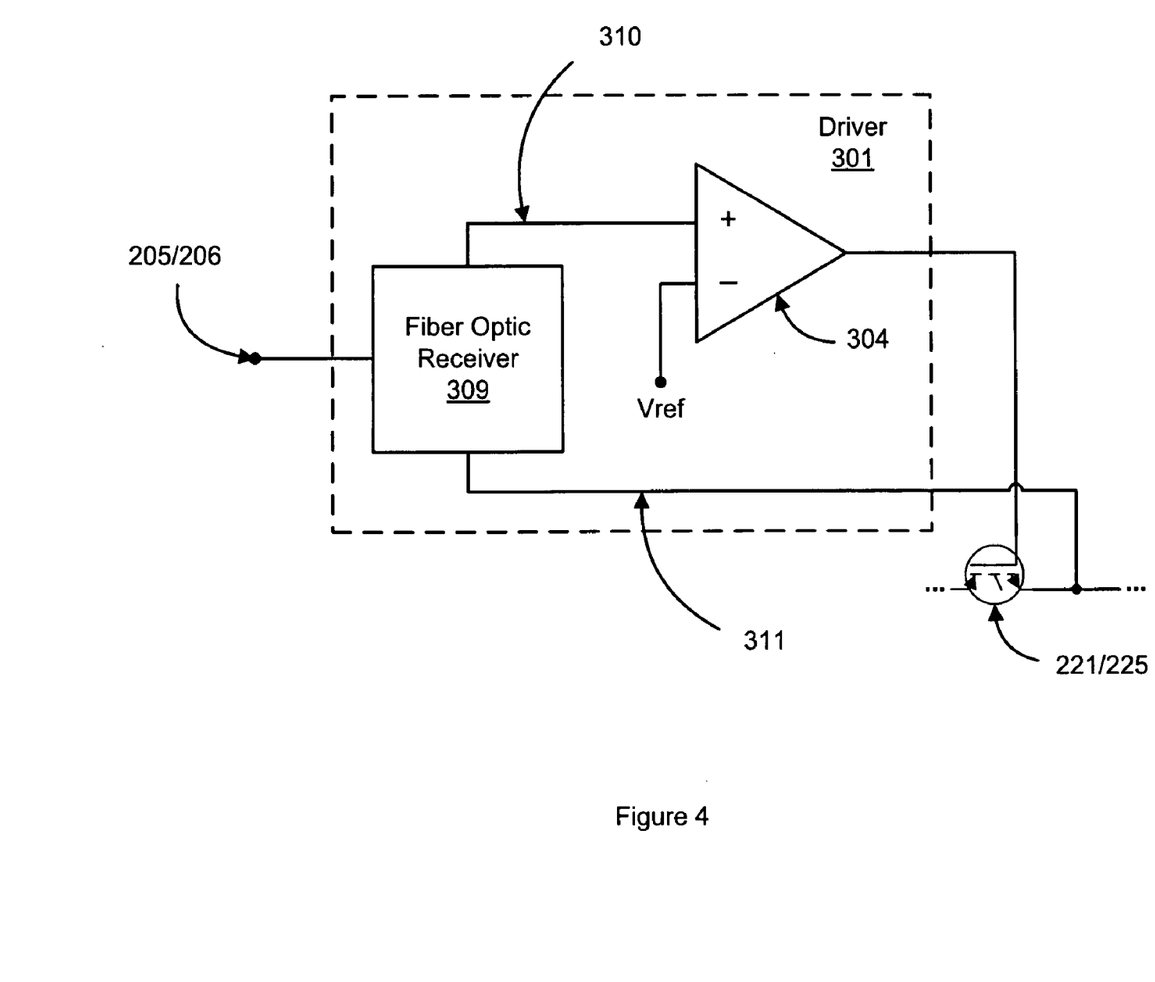
FIG. 4 is a circuit diagram of an exemplary driver that drives a power stage.

FIG. 4 is a circuit diagram of exemplary driver 301 that drives a power stage. For example, driver 301 may be implemented as driver 201 and/or 202 of power stage 203 of FIG. 2. In this embodiment, driver 301 is configured with input 205 or 206 as shown in FIG. 2. Driver 301 may receive an input signal via a fiber optic connection with input 205/206. In response thereto, driver 301 may generate a control signal that is used to drive the power stage. However, other forms of control may be used (e.g., wireless communication, electronic control, etc.).

To generate the control signal, driver 301 may include amplifier 304 and fiber optic receiver 309 to supply the control signal. Input 205/206 may receive a control signal from a controller, such as controller 101 of FIG. 1 described above. In this regard, the control signal is provided to input 205/206 to provide substantially arbitrary control over transistor 221/225. For example, certain applications may desire transistor 221/225 to arbitrarily turn off and on thereby turning the power stage off and on. An example of such an application may include the conduction of electrical energy through a gas. Once a conduction path has been generated through the gas, controlled application of electrical energy to that path may assist in sustaining the path because, among other reasons, controlled decreases in voltage may deter energy-draining spurious discharges.

The control signal provided to input 205/206 may be an optical control signal. Accordingly, driver 301 may be configured with fiber-optic receiver 309 to receive the optical control signal and generate an electronic signal for comparison to a reference voltage Vref via amplifier 304. Amplifier 304 may, in turn, generate a control signal which controls operation of transistor 221/225. Additionally, fiber-optic receiver 309 may sense voltage at transistor 221/225 to assist in the control of amplifier 304.

However the invention is not intended to be limited to control over transistor 221/225. Rather, transistor 221/225 may be operated according to a predetermined sequence, as part of a control loop, or even as desired. Accordingly, the control over transistor 221/225 may be application specific.

While one circuital embodiment has been shown and described, those skilled in the art should readily recognize that the invention is not intended to be limited to such an embodiment. Rather, driver 301 may be configured in other ways to achieve operational control over transistor 221/225. For example, the reference voltage Vref may be coupled to the noninverting input for comparison to a voltage at the inverting input. Another example may include the use of a microprocessor to generate a control signal.

Figure 5:
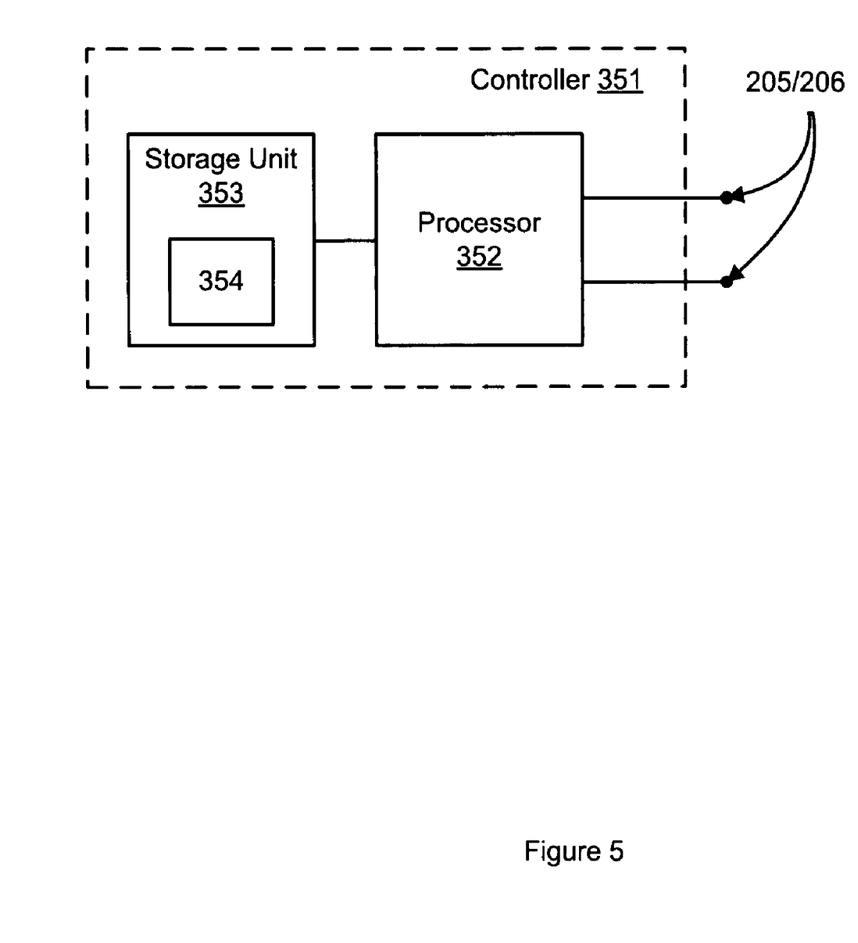
FIG. 5 is a block diagram of an exemplary controller that controls selects zero or more power stages for operation.

FIG. 5 is a block diagram of exemplary controller 351 that controllably selects zero or more power stages for operation, such as power stages 203 and 204 of FIG. 2. Controller 351 may be suitable for use as controller 101 of FIG. 1. In this embodiment, controller 351 includes processor 352 and storage unit 353. Processor 352 may be coupled to input 205/206 of driver 301 such that the driver receives a control signal as described above in FIG. 4. For example, processor 352 may generate a control signal that operates driver 301 via input 205/206. In this regard, storage unit 353 may store software instructions 354 that direct processor 352 to control operations of driver 301, which may in turn control transistor 221/225. In one embodiment, processor 352 is configured to generate an optical control signal for application to input 205/206. Accordingly, software instructions 354 may direct processor 352 to indirectly control transistor 221/225 in an application specific manner (e.g., in a manner, according to a predetermined sequence, as part of a control loop, and/or as desired).

Figure 6:
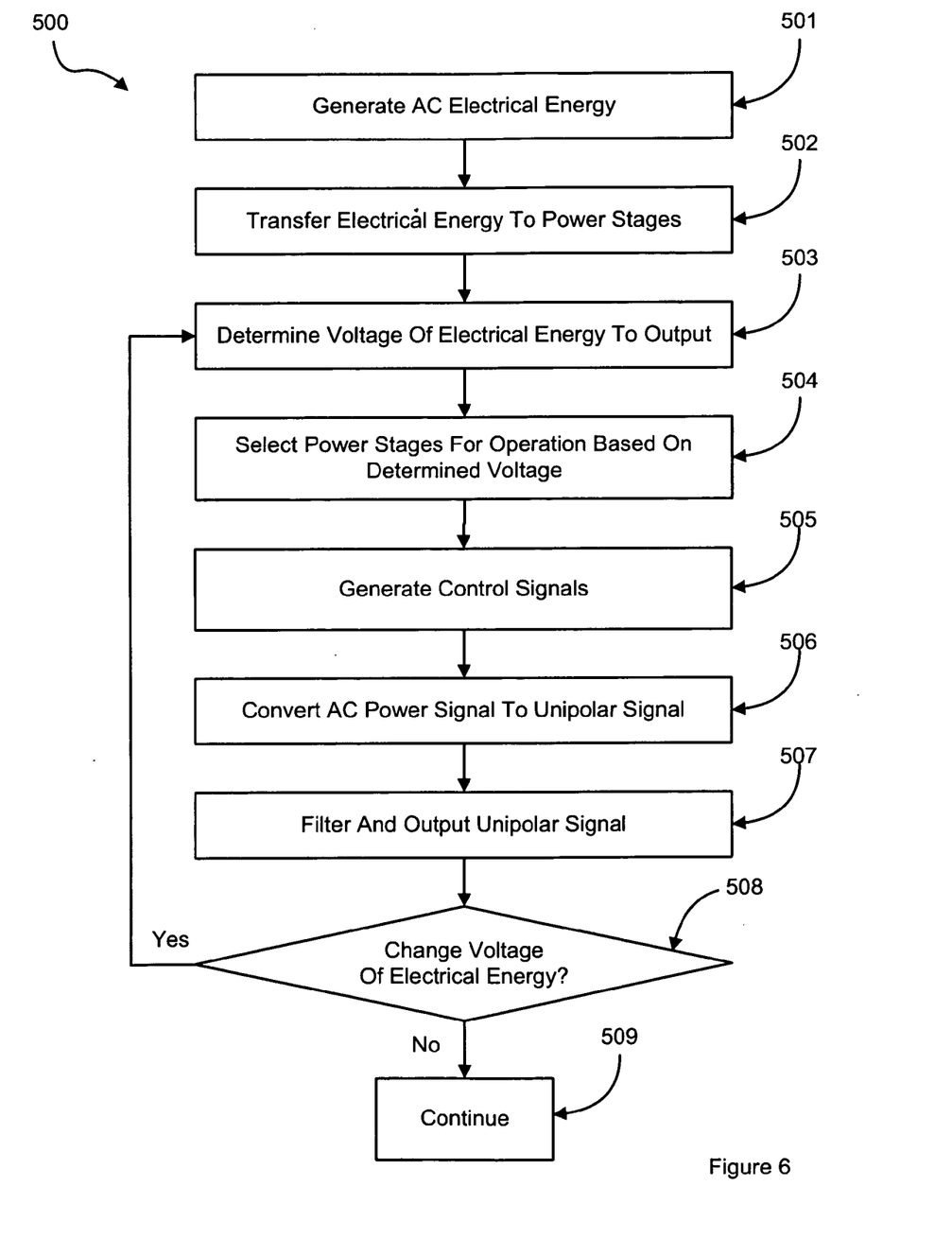
FIG. 6 is a flowchart of an exemplary process for providing electrical energy.

FIG. 6 is a flowchart of exemplary process 500 for providing electrical energy. For example, process 500 may provide AC electrical energy with controllable voltage. In this embodiment, AC electrical energy is generated in process element 501. For example, a power supply, such as power supply 102 of FIG. 1, may provide AC electrical energy greater than about 1V. The electrical energy may then be transferred to power stages, such as power stages 203 and 204 of FIG. 2, for subsequent voltage control, in process element 502.

The output voltage of the electrical energy to be provided may be determined, in process element 503. For example, output voltage of the electrical energy may be decreased or increased depending on a particular application. Such voltage increases and decreases may be performed arbitrarily, according to a predetermined sequence, and/or in response to the condition of the load. Once the voltage is determined, one or more power stages may be selectively operated, in process element 504. For example, when voltage decreases are determined, one or more power stages may be deselected from operation. Similarly, when voltage increases are determined, one or more power stages may be selected for operation. Based on the selections, control signals may be generated in process element 505 to control selection of the power stages.

Of the power stage(s) selected for operation, the power stage(s) receive the generated AC electrical energy and convert that electrical energy to a unipolar signal, in process element 506. For example, the AC waveform of the electrical energy may be rectified (e.g., full wave rectified) such that all voltage is either positive or negative (i.e., without accounting for bias). Alternatively, the power stages may be configured to provide a bipolar signal. The unipolar signal may be filtered and output to a summing node for a particular application, in process element 507. For example, unipolar signals output by selected power stages may add thereby increasing voltage.

Process 500 may additionally include determining whether the voltage of the electrical energy should be changed, in process element 508. For example, when the output voltage is to be increased, additional power stages may be selected for operation. Similarly, when the output voltage is to be decreased, certain power stages may be selected from operation. Accordingly, if a change in the voltage of the electrical energy is to be made process element 508, may return to process element 503 to determine the requisite voltage change such that power stages may be either selected or deselected from operation. If no change in voltage is required, process 500 continues providing electrical energy at the same voltage, in process element 509.

Although one embodiment of process 500 has been shown and described herein, those skilled in the art should readily recognize that the invention is not intended to be limited to the particular illustrated embodiment. For example, certain process elements may be rearranged or configured in other ways that fall within the scope and spirit of the invention. For example, process element 501 may be configured to generate DC electrical energy. As such, converting the AC power signal to a unipolar signal may be unnecessary.

Figure 7:
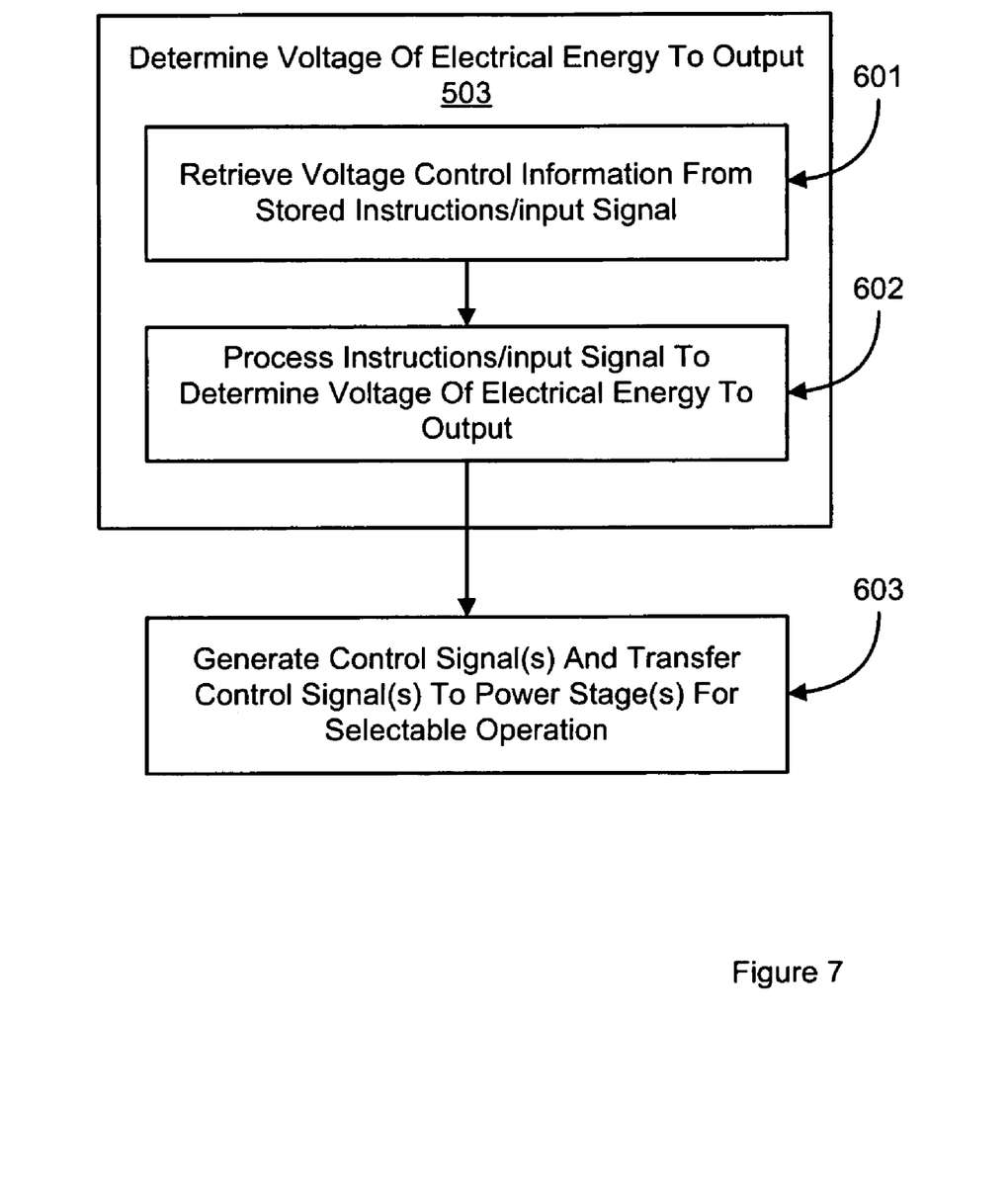
FIG. 7 is a flowchart of exemplary process elements of the process of FIG. 6.

FIG. 7 is a flowchart of exemplary process elements of process 500 of FIG. 6. More specifically, exemplary process element 503 of FIG. 6 is shown as having additional process elements 601 and 602 included therewith and in conjunction with the additional process element of 603. In this embodiment, process element 503 includes retrieving voltage control information from stored instructions and/or an input signal, in process element 601. For example, a driver, such as drivers 202 and 201 of FIG. 2, may receive an input signal which directs the driver to control operability of the power stages. The driver may respond directly to the input signal to control the power stages. For example, the input signal may be an optical control signal generated by a controller, such as controller 101 of FIG. 1. Alternatively or additionally, the driver may respond to the input signal by retrieving software instructions that direct the controller to controllably operate the power stages (e.g., via drivers of the power stages). Accordingly, the input signal and/or the instructions may be processed to determine voltage of the electrical energy to be output, in process elements 602. As described above, power stage control via processing of the input signal and/or processing of software instructions may be performed arbitrarily, according to a predetermined pattern, or as desired.

Once the voltage is determined, the controller may generate one or more control signals and transfer those control signals to various power stages for selectable operation. For example, to scale up the voltage of the electrical energy, the controller may turn on a particular power stage. To scale down the voltage of the electrical energy, the controller may turn off a particular power stage.

Figure 8:
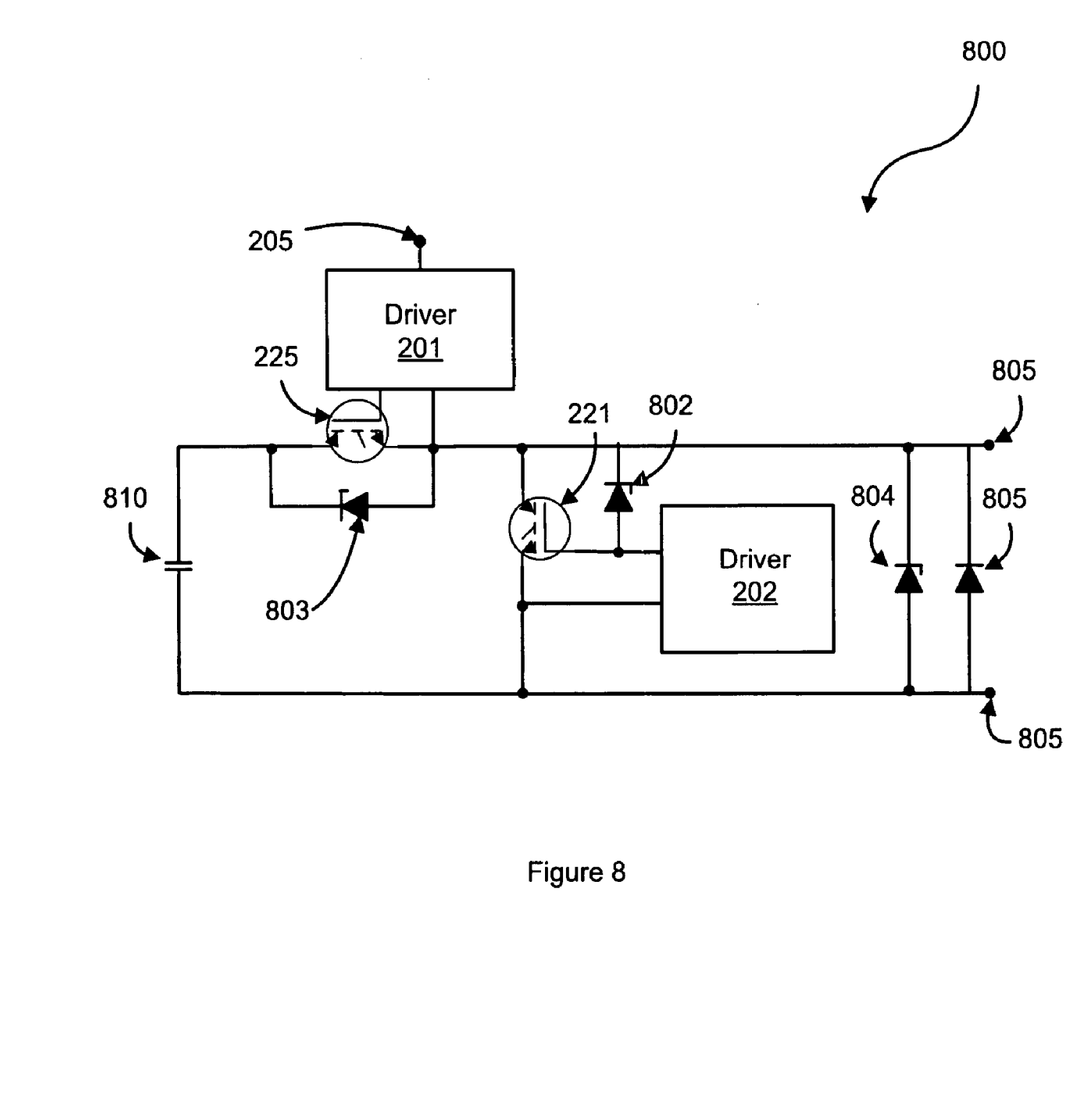
FIG. 8 is a circuit diagram of another exemplary power stage.

FIG. 8 is a circuit diagram of another exemplary power stage 800. In this embodiment, a zener diode 802 is used to bypass power stage 800. In this regard, a plurality of power stages 800 may be configured together in system 900 of FIG. 9 to output a bipolar voltage waveform. In such a configuration, certain power stages 800 are operable to output positive voltage when turned on whereas other power stages 800 are operable to output negative voltage when turned on. In other words, each of power stages 800 add voltage to the output waveform when operable. Thus, a power stage 800 configured for positive voltage contribution will add positively to the output waveform and a power stage 800 configured for negative voltage contribution will add negatively to (e.g., subtract from) the output waveform.

This topology is similar to that illustrated in FIG. 2. Differing from system 203 of FIG. 2, however, is the general operability of system 800 which causes half or less of the power stages 800 to be active at any time. The zener diodes 802 and 804 alleviate problems with AWG turn-on. For example, when operating with discrete trigger modules such as drivers 201 and 202, fully complementary triggering of IGBTs 221 are on unless the IGBTs 225 in the same stage are on to provide intrinsically safe operation of the AWG.

To turn off a power stage 800, a control signal may be generated to trigger the IGBT 221 and shunt electrical current to ground. In this regard, driver 201 may trigger the IGBT 225 to conduct current. The voltage at capacitor 810 may be large enough to reverse bias the zener diode 802 and turn on IGBT 221.

Figure 9:
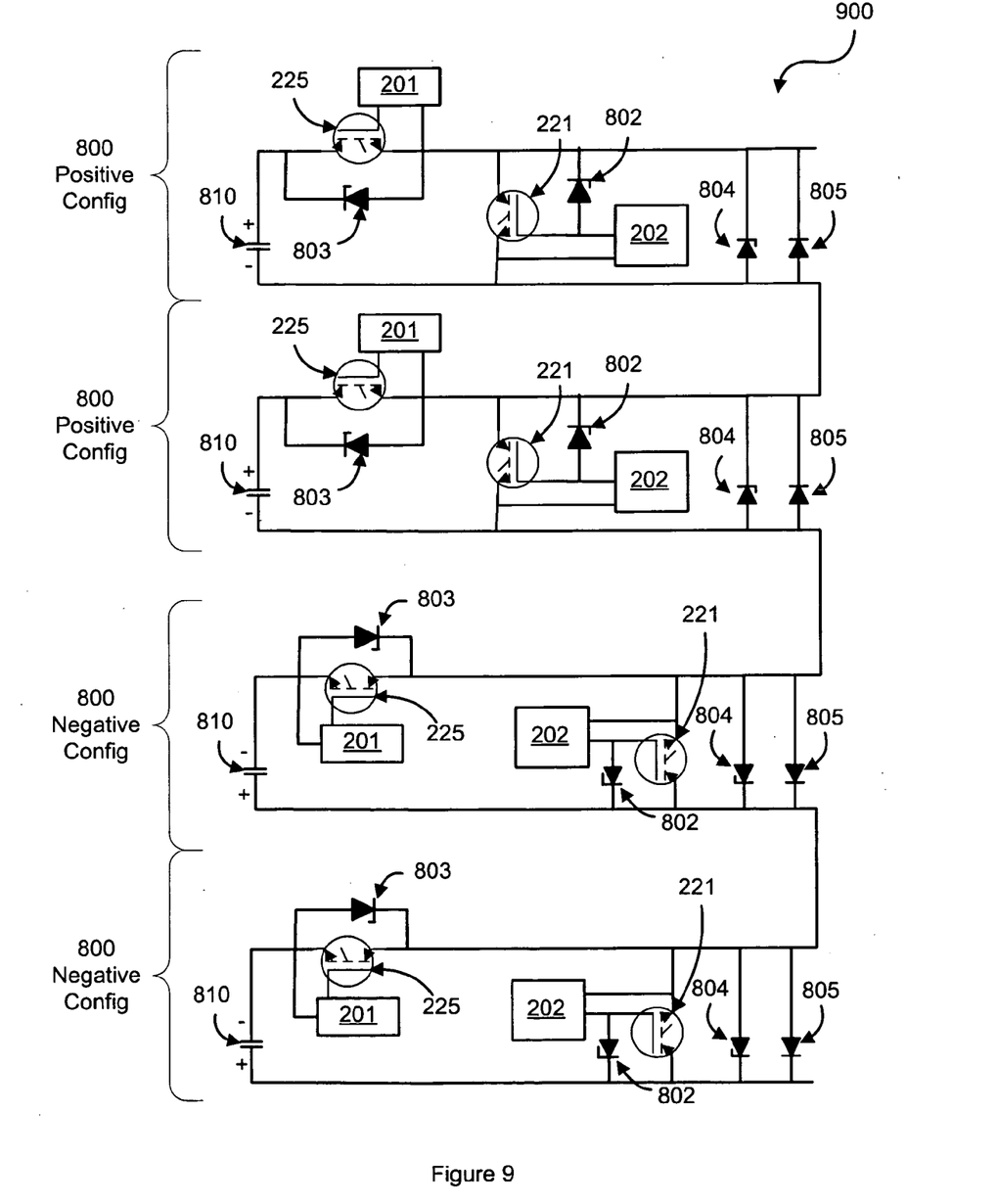
FIG. 9 is a circuit diagram of a power stage configuration using the power stages of FIG. 8.

It should be noted that system 900 does not require symmetry to provide bipolar AWG. For example, a certain number of power stages 800 may be configured to provide positive voltage while another differing number of power stages 800 may be configured to provide negative voltage. Thus, the positive voltage may be greater or less than the absolute value of the negative contribution to the AWG, thereby creating a voltage bias in the AWG that is determinable by the power stage 800 configuration. Although illustrated with respect to power being supplied by capacitor 810, the invention is not intended to be so limited. As mentioned, the power delivery to the power stages, such as the power stages 800, may be implemented as a matter of design choice. For example, electrical energy may be provided to the power stages 800 via a magnetic coupling as shown in FIG. 2. In this regard, the magnetic coupling may be an air core transformer.

Figure 10:
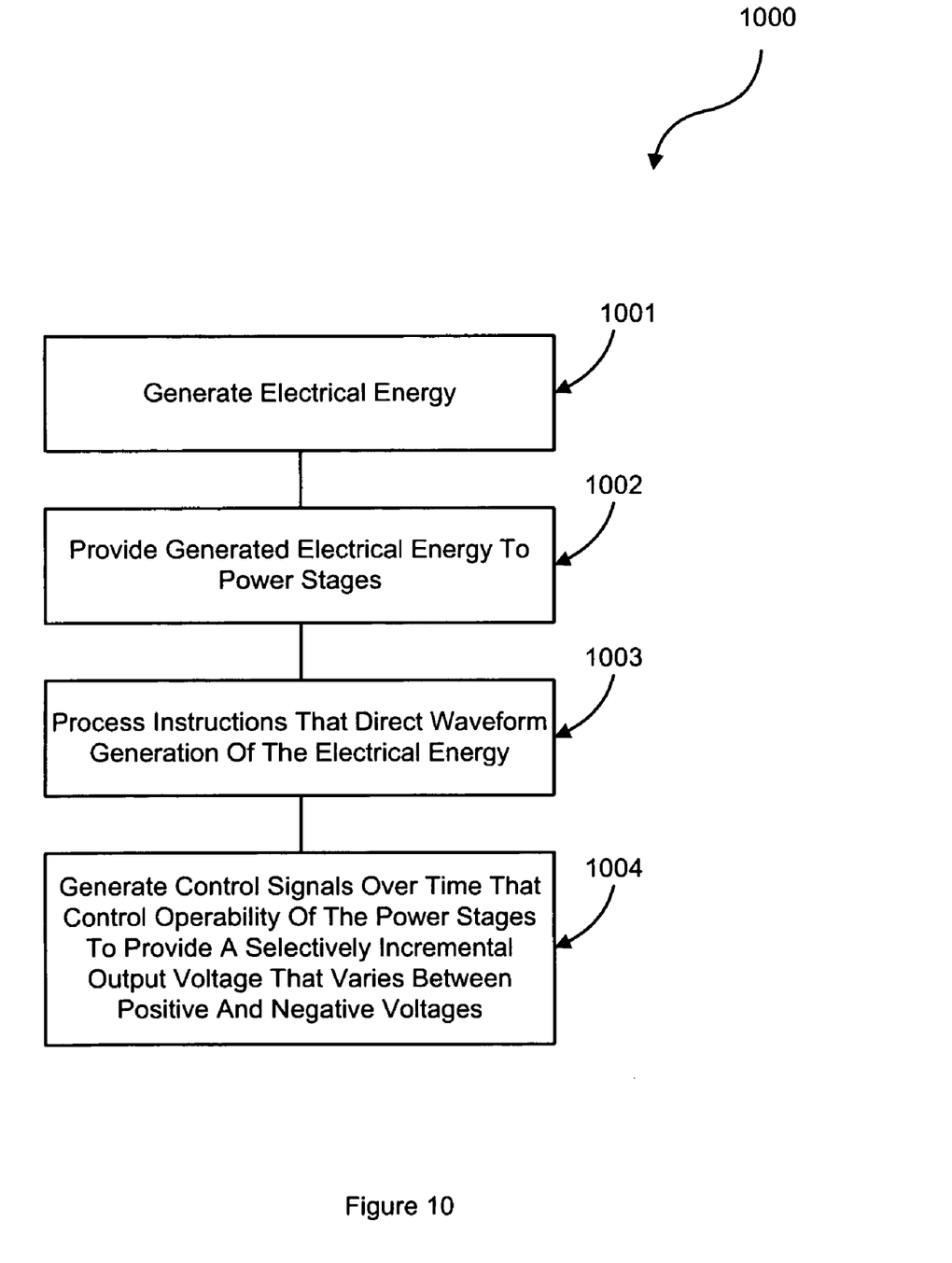
FIG. 10 is a flowchart of an exemplary process for providing bipolar electrical energy.

FIG. 10 is a flowchart of an exemplary process 100 for providing bipolar electrical energy. In this embodiment, electrical energy is generated in process element 1001. Various manners for generating electrical energy are described in non limiting fashion above. The electrical energy is provided to a plurality of power stages 800 in the process element 1002. Power stages 800 are configured to provide an additive voltage step to an overall output waveform. Power stages 800 may operated to add or subtract from the overall voltage waveform that is output from power stage configuration 900 of FIG. 9. For example, a portion of power stage 800 may be configured to deliver positive voltage steps to the output voltage when operable whereas another portion of power stages may be configured to provide negative voltage steps when operable. In this regard, power stages 800 may be controlled to output voltage of virtually any desired discrete waveform. To do so, instructions may direct the generation of controls signals that operate (e.g., turn off/turn on) power stages 800 in a predetermined or even arbitrary fashion in process elements 1003 and 1004. The generated waveform may be bipolar where the voltage of the output waveform varies between positive and negative over time.

To turn off certain power stages 800 when directed by the instructions, control signals may be generated that control IGBTs 225 to turn on and conduct current. This may cause zener diodes 802 to reverse bias and trigger switch (e.g., IGBTs 221) to shunt current to ground, thereby removing power stage 800 from adding to the overall output of system 900.

While the invention has been illustrated and described in detail in the drawings and foregoing description, such illustration and description is to be considered as exemplary and not restrictive in character. For example, certain embodiments described above may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A high voltage bipolar electrical energy generator, including:
   a power supply that provides electrical energy;
   at least two positive power stages coupled to the power supply, wherein each positive power stage is operable to receive the electrical energy from the power supply to only provide a positive voltage increment to the high voltage bipolar waveform when engaged;

at least two negative power stages coupled to the power supply, wherein each negative power stage is operable to receive the electrical energy from the power supply to only provide a negative voltage increment to the high voltage bipolar waveform when engaged; and a controller operable to engage half or less of the at least four power stages to provide their respective voltage increments to the high voltage bipolar waveform during operation of the high voltage bipolar electrical energy generator, wherein the power stages have outputs that are electrically and serially coupled to additively control voltage of the high voltage bipolar waveform, wherein the at least two positive power stages are turned off when the at least two negative power stages are engaged.

2. The high voltage bipolar electrical energy generator of claim 1, wherein each power stage has two insulated gate bipolar transistors communicatively coupled to the controller, wherein one of the insulated gate bipolar transistors of each power stage is operable to rapidly disengage the power stage when directed by the controller.

3. The high voltage bipolar electrical energy generator of claim 1, further including a storage unit that stores instructions for directing the controller to arbitrarily select the power stages to provide arbitrary waveform generation of the high voltage bipolar waveform.

4. The high voltage bipolar electrical energy generator of claim 1, further including a storage unit that stores instructions for directing the controller to select the power stages to generate the high voltage bipolar waveform according to a predetermined sequence.

5. The high voltage bipolar electrical energy generator of claim 1, wherein the power supply is inductively coupled to the power stages.

6. The high voltage bipolar electrical energy generator of claim 5, wherein the inductive coupling is an air core transformer.

* * * * *